US012628262B2

(12) United States Patent
Ledernez et al.

(10) Patent No.: US 12,628,262 B2
(45) Date of Patent: May 12, 2026

(54) ELECTRODE ARRANGEMENT

(71) Applicant: Freiburger Medizintechnik GmbH, Freiburg (DE)

(72) Inventors: Loic Ledernez, Freiburg (DE); Michael Bergmann, Freiburg (DE); Markus Altenburger, Freiburg (DE)

(73) Assignee: Freiburger Medizintechnik GmbH, Freiburg (DE)

( * ) Notice: Subject to any disclaimer, the term of this patent is extended or adjusted under 35 U.S.C. 154(b) by 734 days.

(21) Appl. No.: 18/005,408

(22) PCT Filed: Jul. 13, 2021

(86) PCT No.: PCT/EP2021/069484
§ 371 (c)(1),
(2) Date: Jan. 13, 2023

(87) PCT Pub. No.: WO2022/013229
PCT Pub. Date: Jan. 20, 2022

(65) Prior Publication Data

US 2023/0269859 A1 Aug. 24, 2023

(30) Foreign Application Priority Data

Jul. 13, 2020 (EP) .................................... 20185527

(51) Int. Cl.
*H05H 1/36* (2006.01)
*H05H 1/34* (2006.01)

(52) U.S. Cl.
CPC ............ *H05H 1/36* (2013.01); *H05H 1/3423* (2021.05); *H05H 1/3494* (2021.05); *H05H 2245/32* (2021.05)

(58) Field of Classification Search
CPC ............ H05H 2245/32; H05H 1/3423; H05H 1/3494; H05H 1/36; H05H 1/246;
(Continued)

(56) References Cited

U.S. PATENT DOCUMENTS

2001/0040089 A1 11/2001 Hemingway et al.
2010/0125267 A1* 5/2010 Lee ...................... A61B 18/042
315/111.21

(Continued)

FOREIGN PATENT DOCUMENTS

EP 2936943 B1 6/2017
KR 20120026248 A 3/2012

(Continued)

OTHER PUBLICATIONS

Written Opinion and International Search Report for International Application No. PCT/EP2021/069484, dated Oct. 5, 2021.

*Primary Examiner* — Phuong T Nguyen
(74) *Attorney, Agent, or Firm* — MARSHALL, GERSTEIN & BORUN LLP; Michael P. Furmanek

(57) ABSTRACT

The invention relates to an electrode arrangement for a plasma jet device comprising a first and a second printed circuit board each having an exposed surface of a circuit path serving as electrode and facing the other printed circuit board, a spacer arranged between the first and second circuit board and a plasma cell arranged between the first and second printed circuit board and the spacer wherein the plasma cell has a gas inlet and a plasma outlet. The invention further relates to a plasma head comprising said electrode arrangement.

13 Claims, 7 Drawing Sheets

(58) Field of Classification Search
CPC ... H05H 1/2443; H05H 1/2406; H01J 49/288; H01J 49/26; H01J 49/48; H01J 49/02; H01J 37/317
USPC ............ 219/121.71, 121.48, 121.68, 121.59, 219/121.36
See application file for complete search history.

(56) References Cited

U.S. PATENT DOCUMENTS

| | | | | |
|---|---|---|---|---|
| 2015/0228467 | A1* | 8/2015 | Grinfeld | H01J 49/062 250/396 R |
| 2017/0250064 | A1* | 8/2017 | Baba | H01J 49/288 |

FOREIGN PATENT DOCUMENTS

| | | | | | |
|---|---|---|---|---|---|
| WO | WO-2002078838 | A1 | | 10/2002 | |
| WO | WO-2013109699 | A1 | * | 7/2013 | H05H 1/2406 |

* cited by examiner

ELECTRODE ARRANGEMENT

CROSS-REFERENCE TO RELATED APPLICATIONS

This is the United States national phase of International Patent Application No. PCT/EP2021/069484, filed Jul. 13, 2021, which claims priority to European Patent Application No. EP 20185527.7, filed Jul. 13, 2020, the entire contents of each of which being hereby incorporated by reference herein.

FIELD OF THE DISCLOSURE

The present invention relates to an electrode arrangement for a plasma jet device as well as a plasma head comprising an electrode arrangement.

BACKGROUND

It is known to use non-thermal atmospheric pressure plasma especially in medical devices. The use of non-thermal plasma for dental applications is also known. Non-thermal plasma is generally produced by a gas discharge at atmospheric pressure. Such plasma cannot be produced or sustained over long distances such that the plasma concentrates in a small volume between the electrodes which are arranged in a near proximity. In the small volume between two electrodes, to which is often referred to as plasma cell, prevails a high concentration of plasma particles having a high energy. In order to avoid arcing, which would increase the temperature in the plasma cell due to the high temperatures of the arc, electric barrier discharge devices are often used when it comes to an atmospheric pressure plasma device having a close proximity of the two electrodes. Such a dielectric barrier discharge device having an insulating dielectric material between the two electrodes adding a high electrical resistance in the inter-electrode space, are shown for example in EP 2 936 943 B1 or US 2010/0 125 267 A1. Often the two electrodes are completely encapsulated in a dielectric material, for example a plastic material.

WO 2013/109699 A1 discloses system and method for operating an ionizer using a combination of amplitude modulation and pulse width modulation to control the plasma temperature and the type of ions needed for analytic equipment. The ionization source is a dielectric barrier discharge gas ionizer, which has two metal electrodes separated by an insulator. By protecting the electrodes with a ceramic or dielectric, the ionizer will have a longer lifetime and will generate a cleaner plasma.

WO 2002/078838 A1 discloses non-thermal plasma reactor for chemical reduction of nitrogen oxide (NOx) emissions in the exhaust gases of automotive engines, particularly diesel and other engines operating with lean air fuel mixtures that produce relatively high emission of NOx. The non-thermal plasma reactor is a dielectric barrier type rector in a multi-cell stack configuration. Two E-shaped dielectric barriers are paired together and are sandwiched by electrodes to form a single cell unit.

KR 10 2012 002 6248 A discloses an apparatus for irradiating plasma having a wide irradiation range by generating plasma at normal pressure and having a line array type. The apparatus comprises a substrate stack. The first electrode is formed by strip lines on the surfaces of the multiple substrates of the stack. The second, ground electrode is formed outside the upper and lower substrates and outside the plasma cell. The discharge is induced between the strip lines on the surfaces of the multiple substrates of the stack serving as first electrode and the ground electrode.

One drawback of creating plasma in a dielectric barrier discharge device is that a very high excitation frequency of 10 kHz or more is required. Such high excitation frequencies result in a very complex frequency generator having high electrical losses. When powered by a high frequency generator, the plasma reflects some of the supplied power. The reflected energy is the energy supplied by the generator but not converted into plasma. The reflected power is dangerous for the electrical circuitry. It is dissipated in the form of heat, which may result in overheating damages.

GENERAL DESCRIPTION

The object of the present invention is to provide an electrode arrangement as well as a plasma head with a plasma cell providing stable conditions for igniting plasma in a simple manner.

According to one aspect of the present invention, the electrode arrangement for a plasma jet device comprises a first and a second printed circuit board, each having an exposed surface of a circuit path serving as an electrode and facing the other printed circuit board. A spacer is arranged between the first and the second circuit board. A plasma cell is arranged between the first and second printed circuit board and the spacer. The plasma cell has a gas inlet and a plasma outlet.

The circuit path is attached to a substrate of the printed circuit board in a common manner. The substrate, which may be generally provided as a plane layer, provides a support for the circuit path (conductive track). The substrate is made of a dielectric material, preferably any common printed circuit board (PCB) material such as FR4—a composite material composed of woven fiberglass cloth with an epoxy resin binder that is flame resistant (self-extinguishing), or silicon. The substrate may also be made of glass, a ceramic material or plastic, preferably a fiber-enforced plastic. Such materials and the PCBs made thereof are generally inflexible or rigid. The PCB including the substrate and the circuit path may also be made of flexible material. Such PCBs are known as flexible PCBs and comprise, for example, a substrate made of polyimide or FR4. In combination with a flexible PCB, the spacer between the PCBs is generally also made of a flexible material. The flexibility of the complete electrode arrangement may be an elastic or a ductile one.

The substrate itself may comprise a spacer in order to provide a stable distance between the two exposed surfaces. Accordingly, the spacer may be integrally formed with the substrate and the substrate may not be designed as a plane but as a 3-dimensional component. The distance between the electrodes may be in a range from 1 μm to 5 mm. The plasma cell in the electrode arrangement may be defined by the first and second printed circuit boards comprising the two electrodes for igniting the plasma and the spacer is arranged along the sides of and in between the two circuit boards. The spacers are arranged along the gas flow direction from the gas inlet to the plasma outlet, when the electrode arrangement in the plasma jet device is in operation. The spacer preferably builds the side walls of the plasma cell.

The distance between the two printed circuit boards and hence between the two electrodes may be defined by the height of the spacers, i.e. the height of the side walls. Accordingly, the distance between the two electrodes may be defined very precisely. A precisely defined and uniformed distance between the two electrodes over their surface area allows the ignition of a gas in the plasma cell without arcing.

The spacer may be made of plastic, preferably polyimide. Polyimides are temperature stable up to over 200° C. and also have a high resistance against physical or chemical etching. Therefore, spacers made of polyimide provide a stable distance between two printed circuit boards in operation. Alternatively, the spacer may be made of any other insulating material for example the same material as the substrate of the printed circuit boards. The spacer may be attached to the printed circuit board for example by gluing or soldering or may be integrally built with a printed circuit board.

Preferably, the electrode is laterally spaced apart from the spacer. The spacer extends, as indicated above, in one embodiment along the flow direction of the gas and builds two side walls of the plasma cell. The spacer may comprise two spacer components each building a side wall of the plasma cell. In a direction traverse to the flow direction, the electrodes may be spaced apart from the spacer. Due to the short distance between the two electrodes, they may be heated in operation. When introducing a gap between the electrode and the spacer, the temperature development of the spacer may be limited or reduced. Accordingly, a heating of the spacer beyond a critical temperature and a deformation of the spacer is prevented leading to a stable inter-electrode distance in operation over time. In a preferred embodiment, a groove is arranged in the printed circuit board between the electrode and the spacer. The gap between the spacer and the electrode may be provided by a groove. The groove may be defined by an area where no circuit path is applied to the substrate or where the conductive layer of the circuit path is removed, respectively. The groove may extend basically in flow direction along the spacer and the electrode, preferably in between the spacer and the electrode. The grooves may encompass the electrode on two sides. In such an embodiment each electrode is limited by two grooves. The grooves may surround the electrodes further, e.g. on all four sides of the electrodes.

According to one aspect, the first and the second printed circuit boards are arranged in parallel to each other. The printed circuit boards may be a one-sided one-layer printed circuit board. The electrodes and the electrical connections for the electrodes are arranged on one side of the substrate. The printed circuit board and especially the exposed surfaces of the circuit paths serving as electrodes are arranged parallel to each other. Therefore, the surface of the circuit paths is in particular electrically exposed. A parallel arrangement of two plane electrodes having an electrode surface allows to ignite a plasma between the two electrodes in the plasma cell uniformly. It also avoids the effect of arcing which would lead to higher temperatures and which should be avoided especially in an electrode arrangement for a medical device.

The two printed circuit boards may have an identical shape and are arranged in a flipped position. The shape of the printed circuit boards may be defined by the outline and dimensions of the substrate and/or the outline and dimensions of the circuit paths. The two printed circuit boards may be flipped such that the two circuit path sides of the printed circuit boards are facing each other and accordingly the two electrodes as part of the circuit path are facing each other, as well. The use of two printed circuit boards having the same shape in an electrode arrangement reduces production costs due to a high number of non-variable parts.

The printed circuit board may have a finger-shaped projection at a rear end having an electrical connection. The electrical connection may be provided by a part of the circuit path being bare. Alternatively, a mechanical connector may be provided for connecting, for example electrical wires, with the circuit board. The finger-shaped projection may be arranged asymmetrically at rear end of the printed circuit board, i.e. on one side of the rear end such that at the gas inlet in the middle of the rear end the risk of ignition is reduced to due to an increased distance between the two electrical connectors and the electrical connection does not interfere with the gas flowing to the plasma cell in operation. Due to the asymmetrical arrangement, the electrical connections of the two printed circuit boards do not interfere with one another when the two printed circuit boards are arranged in a flipped position. Accordingly, the electrical connectors are accessible and, for example, a wire may be attached to the electrical connections. Each printed circuit board has preferably one electrical connection. Alternatively, the electrical connection may also be provided on an outer side of the printed circuit board in the electrode arrangement, i.e. on the opposite side of the circuit path with regard to the substrate, for example by a through-hole in the substrate, or by a male-female connector.

The exposed surface of the circuit may comprise a coating, preferably a gold coating. The exposed surface of each of the two circuit paths serving as electrode is arranged in the plasma cell. The plasma may alter the electrode material for example by chemical etching or by physical etching. In order to improve the durability of the electrodes and to make them more resistant, a coating may be applied covering the surface of the electrode.

A further object of the present invention relates to a plasma head having a first and an opposite second end comprising an electrode arrangement as defined above on the first end. The plasma head comprises a connector for connecting the plasma head with a handle on the second end. The head comprises electrical and gas connections from the connector to the electrode arrangement. The plasma head may have the electrode arrangement on the first end and the connector at the second end. The connector may comprise an electrical connector and a gas connector. The connector may serve as a mechanical connector for connecting the plasma head with a handle of the plasma jet device.

According to one aspect the plasma head may comprise a plasma exiting tip. The plasma exiting tip may be arranged at the first end of the plasma head. The plasma exiting tip may be fluidly connected to the plasma cell. In one embodiment the plasma exiting tip may be in form of a hollow cylinder, which is preferably made of polyimide. Alternatively, the plasma exiting tip may consist of two sheets which are connected to each other at two lateral sides of the sheets preferably consisting of a polyimide film. Alternative shapes of a plasma exiting tip may be used depending on the type of use. The hollow cylindrical form may be used, for example, for disinfecting a root canal and flat sheet like tips may be used, for example, for disinfecting periodontal pockets.

The electrode arrangement may be located in the plasma exiting tip of the plasma head or just behind the plasma exiting tip in a rigid head body. The electrode arrangement may serve as plasma exiting tip particularly in combination with a flexible electrode arrangement. Such an arrangement provides the advantage that the device is more versatile and the plasma may be directed to locations which are not accessible directly or easily. This may be further supported by rotational connection between the plasma exiting tip and the head body. The plasma exiting tip and accordingly the electrode arrangement may be rotational by 360 degrees without a rotational stop, limited by a rotational stop for example to 90 or 180 degrees or a fixed one. A limited rotational movement of the tip reduces the complexity of the electrical lines from the connector to each electrode. Additionally, the distance from the generation in the plasma cell of the electrode arrangement to the target area is in such an embodiment shorter, increasing the efficacy of the plasma jet device.

The plasma head may comprise a duct from a connector to the plasma outlet, which may be at the head body or the plasma exiting tip. At one end of the duct being at the second end of the plasma head the gas connector may be arranged. The gas may flow in operation from the gas connector to the electrode arrangement via the duct. The electrode arrangement may also be located in the gas duct. In one embodiment the gas duct may have a recess for the electrode arrangement. The duct may also receive a wiring of the electrode arrangement. In order to avoid an ignition of the gas in the area of the wiring, the wires and the connectors are preferably at least towards the duct electrically isolated. The duct may end in a plasma exiting tip. The plasma exiting tip may be interchangeable and replaceable or may be fixed permanently attached to the head body.

The connector may comprise the mechanical connector having multiple aligned cylindrical segments arranged coaxially to each other. The connector may further comprise two electrical connectors, i.e. one connector for each of the two electrodes in the plasma cell. The electrical connectors may extend radially beyond the outer cylindrical surface of the cylindrical segments. Preferably, the two electrical connectors are arranged at different cylindrical segments. The electrical connectors may have a support in the mechanical connector and a contacting portion, e.g. a spring clip or a biased contact, which extends radially in the same direction or in opposite directions at opposite sides of the connector. In one embodiment, both electrical connectors may be attached to a corresponding printed circuit board, wherein the two printed circuit boards are connected to each other to build a hollow cuboid extending along the axis of the cylindrical segments. The hollow cuboid may serve as a support for the electrical connectors and provide the electrical wiring for the two connectors. The support may be arranged in the duct in the area of the connector. In operation, the gas may flow through the hollow inside of the support. Two electrical wires may close the electrical wiring from the support to the electrode arrangement.

Preferably, the gas connector is arranged at a front face of the connector and the cylindrical segments of the connector, respectively. Accordingly, the hollow of the cuboid is fluidly connected with the gas connector and the gas may flow in operation through the hollow inner of the cuboid. The mechanical connector may be designed such that, at least when connected to the handle, it is sealed to the outside in order to avoid gas leakage, for example through the electrical connectors.

One aspect of the present invention relates to a method of operating an electrode arrangement and a plasma head indicated above. In operation, a gas enters the plasma cell of the electrode arrangement. Preferably noble gases like helium or argon or oxygen, or air, or a gas combination containing at least one of said gases is used. A preferred gas combination contains helium and oxygen. However, any gas without physical constraint may be used in order to be ignited in the plasma cell. The electrodes may be connected with a pulsed voltage source. The frequency of the pulsed voltage source leading to pulse discharges between the two electrodes in the plasma cell may be in the range of 200 Hz to 50 MHz, preferably 600 Hz to 2 kHz. The pulse voltage source may preferably be a DC source leading to a pulse DC discharge in the plasma cell. A supply voltage to the electrodes of below 3000 Volts, preferably below 1000 Volts may be supplied. The voltage may be lower compared to an electrical barrier discharge device since no huge electrical resistance in form of a dielectrical barrier is arranged between the two electrodes. The gas is ignited in the plasma cell and a plasma is produced. Then the plasma exits the electrode arrangement at a outlet. The plasma may exit the plasma head at a second end, preferably through the plasma exiting tip.

BRIEF DESCRIPTION OF THE DRAWINGS

Preferred embodiments of the present invention are described by the way of example only, with reference to the accompanying drawings in which.

DETAILED DESCRIPTION

Figure 1:
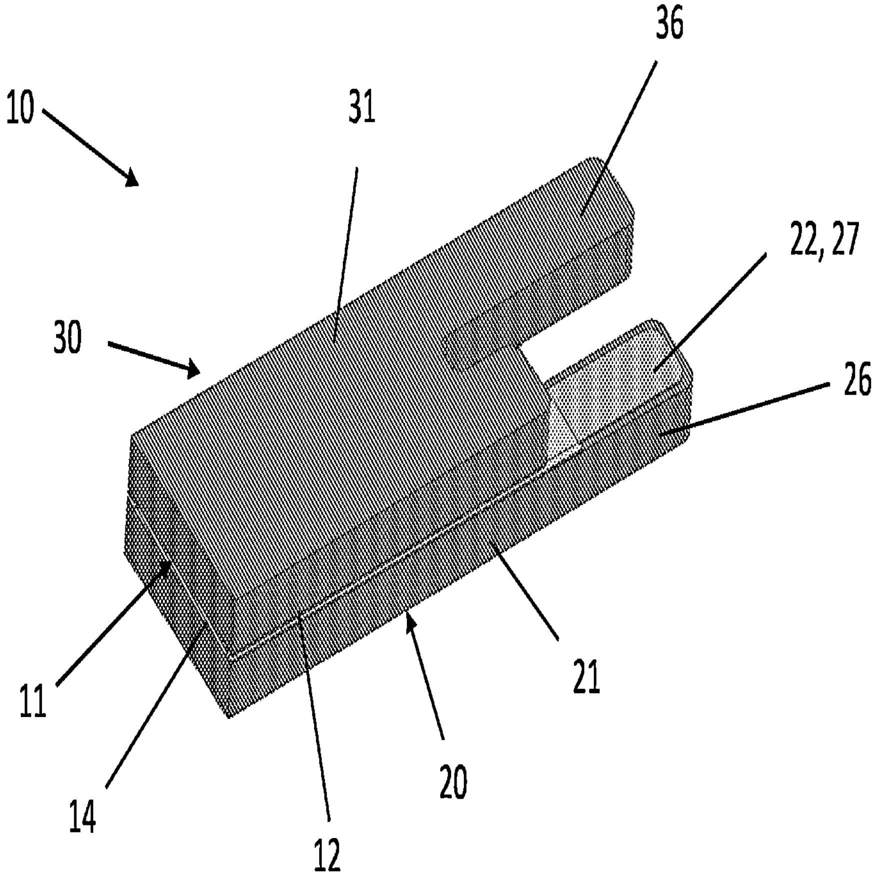
FIG. 1 shows a first view of an electrode arrangement.
Figure 2:
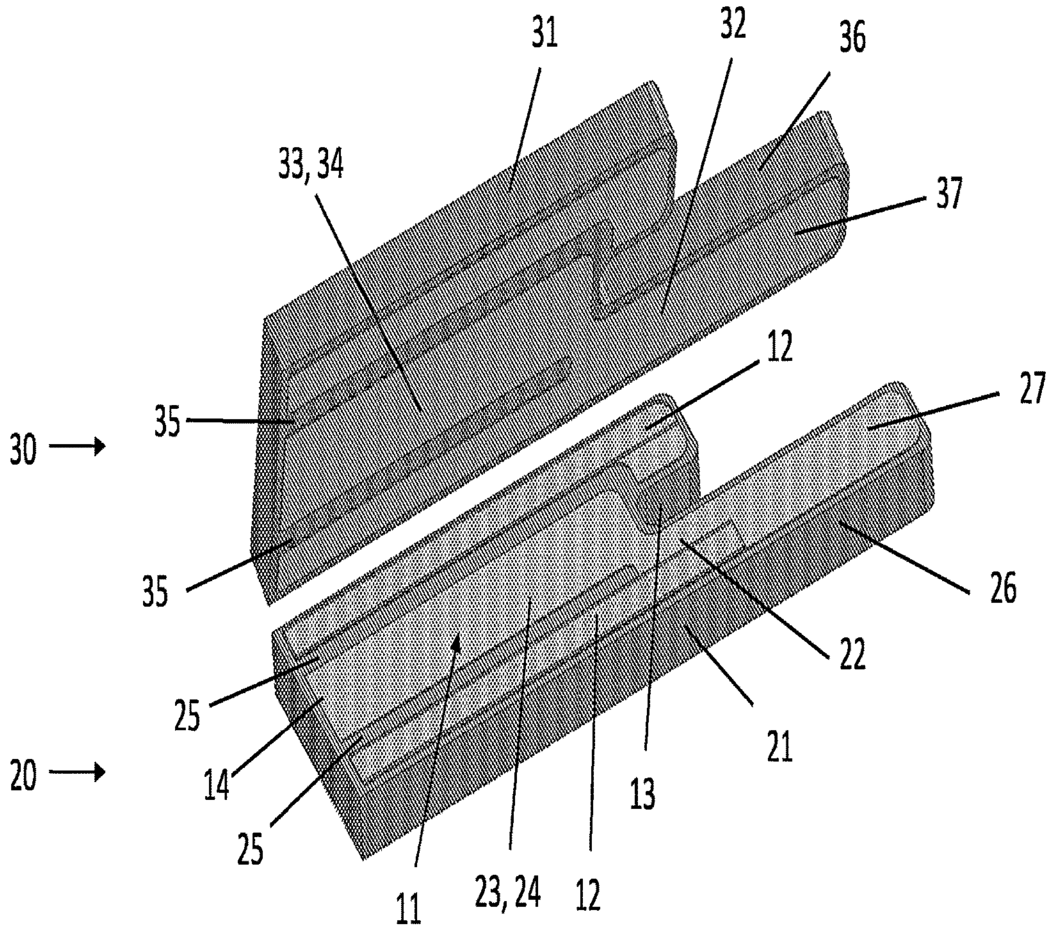
FIG. 2 shows a second view of the electrode arrangement.

FIGS. 1 and 2 show an electrode arrangement 10 for a plasma jet device. The electrode arrangement 10 comprises a first printed circuit board 20 and a second printed circuit board 30 which are arranged parallel to and on top of each other. Each of the two printed circuit boards 20, 30 has a conductive track 22, 32 attached to a substrate 21, 31. The printed circuit boards 20, 30 of the present embodiment are each a one-layer substrate having conductive tracks 22, 32 that are only on one side of the substrate 21, 31. The substrate 21, 31 is made of an isolating material. In the present embodiment, the substrate 21, 31 is made of FR4 or any common PCB material and the conductive tracks 22, 32 are made of copper. In alternative embodiments the printed circuit board 20, 30 may be multi layered and/or comprising two-sided circuit boards.

Each of the printed circuit boards 20, 30 has a finger-shaped projection 26, 36 with an electric connection 27, 37. The electrical connections 27, 37 may be connected with an electrical wiring (not shown) of the electrode arrangement 10. The two printed circuit boards 20, 30 are spaced apart from each other and kept in this position by the way of a spacer 12. A plasma cell 11 is located between the two printed circuit boards 20, 30 and the spacer 12.

FIG. 2 shows an electrode arrangement 10 in which, only for the sake of demonstrating the structure of the elements between the two substrates, the second printed circuit board 30 is tilted upwards. In general, the two printed circuit boards 20, 30 are arranged parallel to each other, wherein especially the exposed surfaces of the conductive tracks are in parallel to each other 23, 33. The electrode arrangement 10 shown in FIG. 2 may be the same as the electrode arrangement 10 shown in FIG. 1. As can be seen, the two printed circuit boards 20, 30 have an identical shape and structure. The second printed circuit board 30 is flipped, i.e. is arranged in a flipped position, with regard to the first printed circuit board 20, such that the conductive tracks 22, 32 are facing each other. The conductive tracks 22, 32 are largely covering one surface of the substrate 21, 31. The plasma cell 11 has a gas inlet 13 and a plasma outlet 14. The conductive tracks 22, 32 have an exposed surface 23, 33 inside the plasma cell 11, such that the gas entering the plasma cell 11 through the inlet 13 gets ignited in the plasma cell 11 and subsequently exits the electrode arrangement 10 through the outlet 14. The outlet 14 extends in between the printed circuit boards 20, 30 and the spacer 12. The conductive tracks 22, 32 are covered on the inside of the plasma cell 11 by a gold coating 24, 34 (not shown) in order to have a better chemical and physical resistance against the plasma. In the plasma cell 11 prevails in normal operation a flow direction from the inlet 13 to the outlet 14. Inside the plasma cell 11 is a groove 25, 35 in the surface of the printed circuit boards 20, 30 on both sides of the plasma cell 11 along the spacer 12. The grooves 25, 35 have in one embodiment a depth of the thickness of the conductive track 22, 32 such that the conductive track 22, 32 is interrupted between the exposed surface 23, 33 and the conductive track 22, 32 below the spacer 12. The groove 25, 35 as shown in the embodiment is not machined into the substrate 21, 31. In another embodiment, the groove 25, 35 may reach into the substrate 21, 31.

The spacer 12 is shown in FIG. 2 attached to the first printed circuit board 20, particularly to the conductive track 22 of the first printed circuit board 20. In the assembled state, as shown for example in FIG. 1, the spacer is attached to both printed circuit boards 20, 30, especially to both conductive tracks 22, 32. The spacer 12 comprises in one embodiment two spacer parts wherein each spacer part provides a side wall of the plasma cell 11. Both parts are arranged besides the plasma cell and extend along plasma cell 11 in flow direction. These both spacer parts are basically separated by the plasma cell 11 with the inlet 13 and the outlet 14. The spacer 12 defines the distance between the two exposed surfaces 23, 33 serving as electrodes for igniting the plasma. In alternative embodiments, the spacer 12 and the spacer parts may have a similar or the same shape but may consist of two layers wherein each layer is attached to one of the printed circuit boards 20, 30.

Due to the flipped arrangement of the two printed circuit boards, both finger shaped projections 26, 36 are arranged on the same end, i.e. on the end at which the gas inlet 13 is allocated, but on the opposite side. The two electrical connections 27, 37 are easily accessible such that the wiring of the electrode arrangement 10 may be attached thereto, e. g. by soldering.

Figure 3:
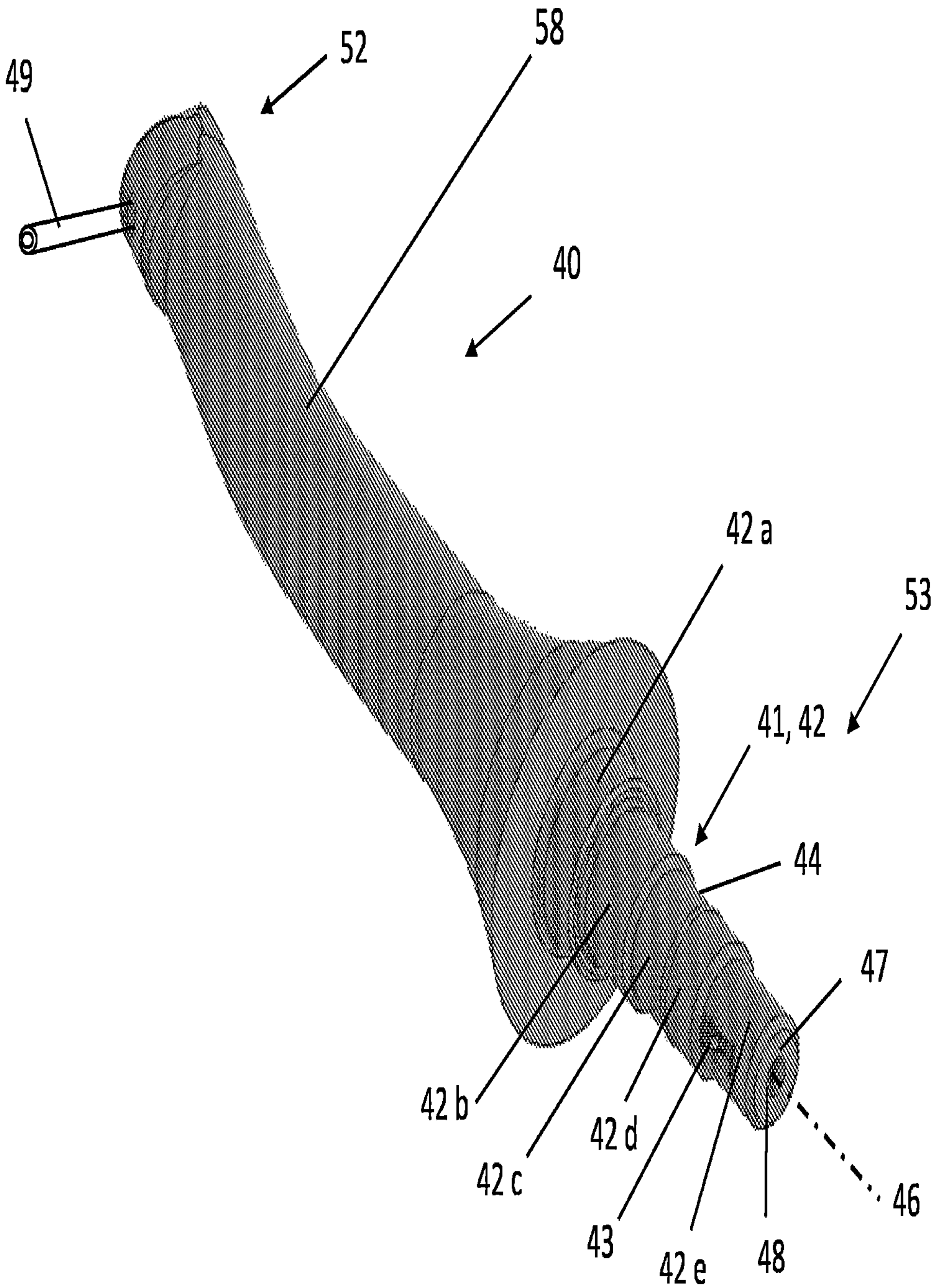
FIG. 3 shows a 3-dimensional view of a plasma head in a first embodiment comprising an electrode arrangement.

FIG. 3 shows a 3-dimensional view of a plasma head 40 comprising the electrode arrangement 10 according to the invention. The plasma head 40 has a plasma exiting tip 49 on a first end 52, a head body 58 and on a second end 53 opposite to the first end 52 a connector 41. The connector 41 comprises a mechanical connector 42 for connecting the plasma head 40 with a handle (not shown). The mechanical connector 42 comprises multiple cylindrical elements 42*a-e*, which are arranged on the longitudinal axis 46 of the plasma head 40, i.e. are arranged coaxially to each other. The diameter of the cylindrical segments 42*a-e* is decreasing towards the second end 53 of the plasma head 40. On a front face 47 the connector 41 has a gas connector 48 serving as a gas inlet for the plasma head 40. Further, the connector 41 comprises electrical connectors 43, 44. The first electrical connector 43 is arranged on the cylindrical element 42*e* and the second electrical connector 44 is arranged in a cylindrical element 42*b*. In both of the electrical connectors 43, 44 a spring clip extends radially outwards beyond the outer surface of respective cylindrical element 42*b, e*.

Figure 4:
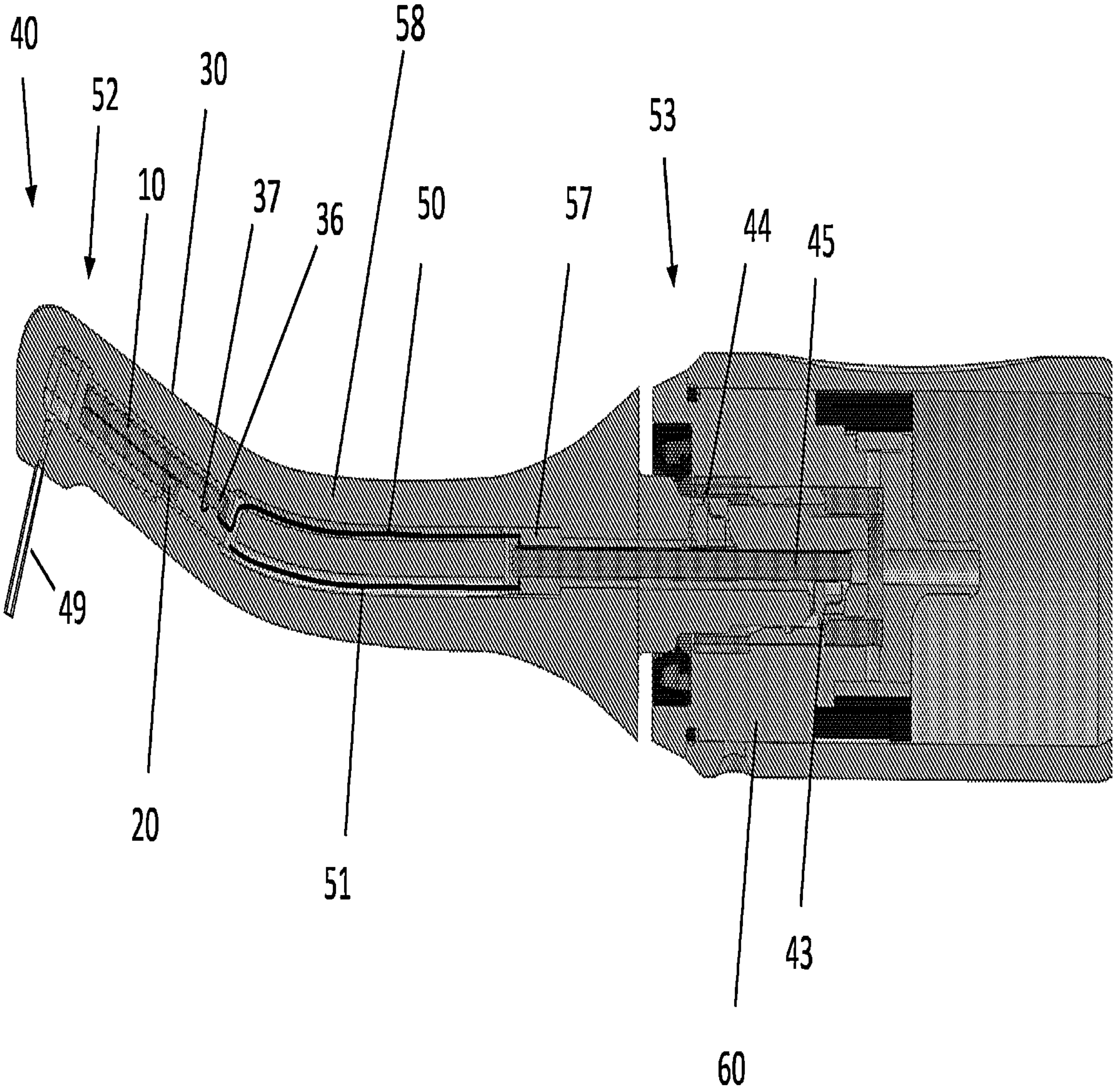
FIG. 4 shows a sectional view of the plasma head according to FIG. 3.

FIG. 4 shows a sectional view of the plasma head 40 according to FIG. 3 with its male connector 41 inserted in a handle 60 but not snapped into the female connector of the handle 60. From the gas connector 48 at the front face 47 extends a duct 57 towards the first end 52 and exits the plasma head 40 in the plasma exiting tip 49. The duct 57 is sealed to the surrounding when the plasma head 40 is attached to the handle 60 such that only gas can enter through the gas connector 48 and exit through the plasma exiting tip 49. In the area of the connector 41 a hollow cuboid is arranged serving as a support 45 for the electrical connectors 43, 44. Therefore, the support 45 has a basically cuboid shape with a hollow inner core serving as a gas channel. The support 45 is made of a substrate. The support 45 comprises on its outside surfaces conductive tracks each connected with one of the connectors 43, 44. Each of the conductive tracks of the support 45 is connected with an electrical wire 50, 51 connecting the electrical connectors 43, 44 with the electrical connection 27, 37 of the electrode arrangement 10. The electrode arrangement 10 is also arranged in the duct 57. The electrode arrangement 10 is placed in the duct 57 such that the gas can only pass through the gas inlet 13 and subsequently through the plasma cell 11.

At the first end 52 of the plasma head 40 the plasma exiting tip 49 is fluidly connected with the duct 57. In the shown embodiment, the plasma head 40 is built as a separate part being interchangeable, i.e. being replaceable. The duct 57 shows a 90 degree turn between the electrode arrangement 10 and the transition to the plasma exiting tip 49. In other embodiments, the plasma exiting tip 49 may be arranged straight on in flow direction, either without a turn or with a predetermined angle. However, a turn of approximately 90 degree may be convenient for the operator, especially for the use as a dental device, where other accessories like drills also have a 90 degree angle.

Figure 5:
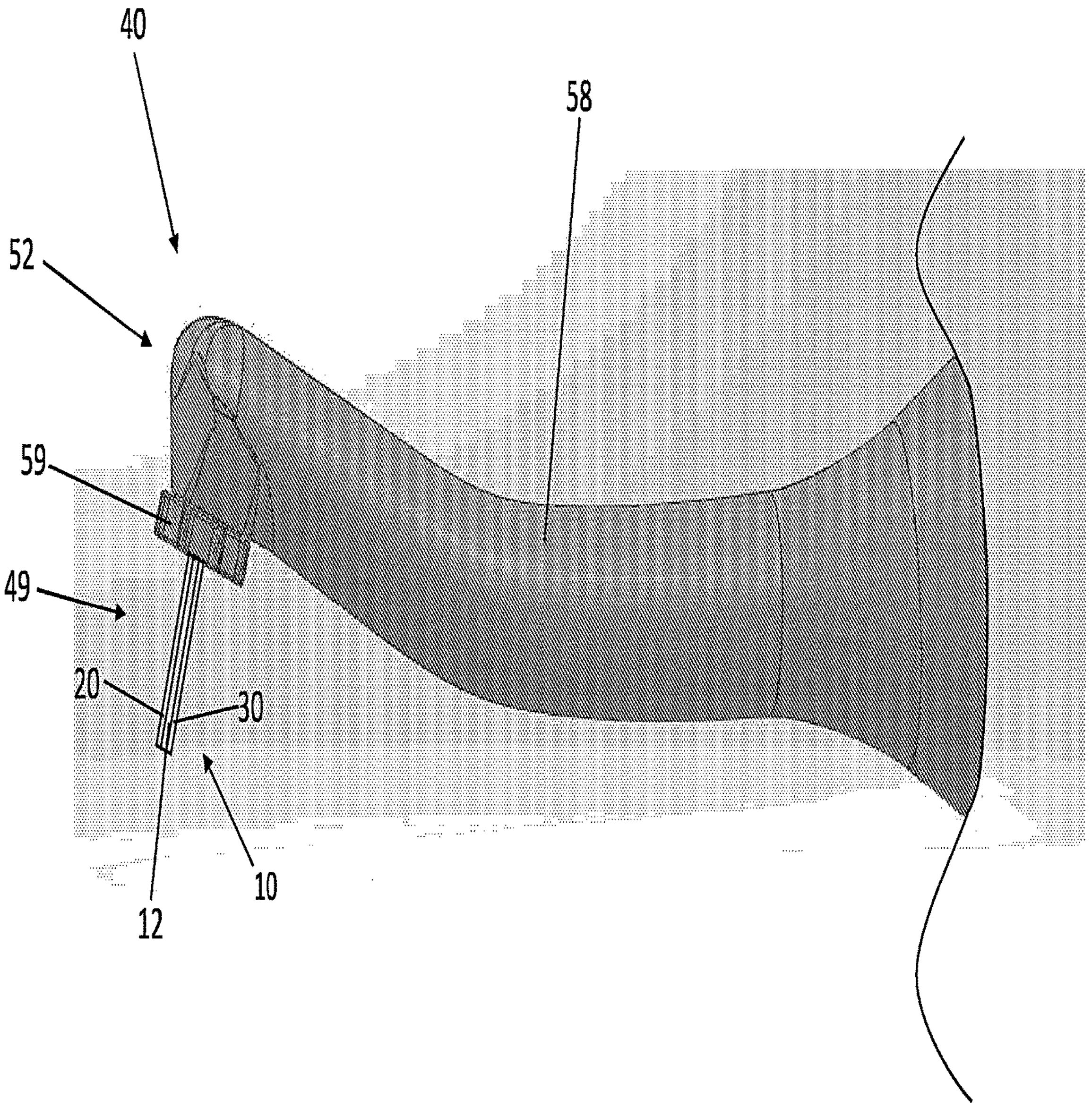
FIG. 5 shows a 3-dimensional view of a plasma head in a second embodiment comprising an electrode arrangement in a plasma exiting tip

FIG. 5 shows a second embodiment of a plasma head 40 with an electrode arrangement 10. In contrast to the embodiment shown in FIGS. 3 and 4, the electrode arrangement 10 is not located in the head body 58 but in the plasma exiting tip 49. The tip 49 is connected via a pivot bearing to the head body 58 and comprises a thumb wheel for rotating the electrode arrangement 10 around its longitudinal axis. The pivot bearing may comprise a circular protrusion extending into a circular notch. The rotational movement is limited by stops to 90 degrees. In one end stop position, as shown, the first and second printed circuit boards 20, 30 are arranged transverse to the longitudinal extension of the head body 58 and in the other end stop position the printed circuit boards 20, 30 are arranged parallel to the longitudinal extension of the head body 58. The printed circuit boards 20, 30 and the spacer 12 are made of a flexible material. The substrate 21, 31 and the spacer 12 are made of e.g. polyimide.

The flexible printed circuit boards 20, 30 are very thin, generally several tens of μm. In combination with a thin and flexible spacer 12, the tip 49 is easily bendable to left and right direction in FIG. 5. The tip 49 has preferably a rectangular cross section with a width defined by the width of the printed circuit boards 20, 30 which is greater than the height defined by the thickness of the two printed circuit boards 20, 30 and the spacer 12. The ratio of width to height is preferably greater than 5:1, more preferably greater than 50:1, further preferably greater than 100:1. Such a design results generally in higher stiffness against bending in direction of the width than in direction of the height. The pivot bearing improves the handling during a procedure with a non-symmetrical cross section by allowing the user to align the tip 49 for example with the tooth pocket to be treated.

The head body 58 comprises also a connector 41 (not shown), a duct 57 for guiding the gas towards the plasma cell in the plasma exiting tip 49 similar or identical to the duct 57 shown in FIG. 4 and an electrical wiring for the first and second electrode. The first electrical line 50 is connected to the electrical connection of the first printed circuit board 27 and the second electrical line 51 is connected to the electrical connection of the second printed circuit board 37.

Figure 6:
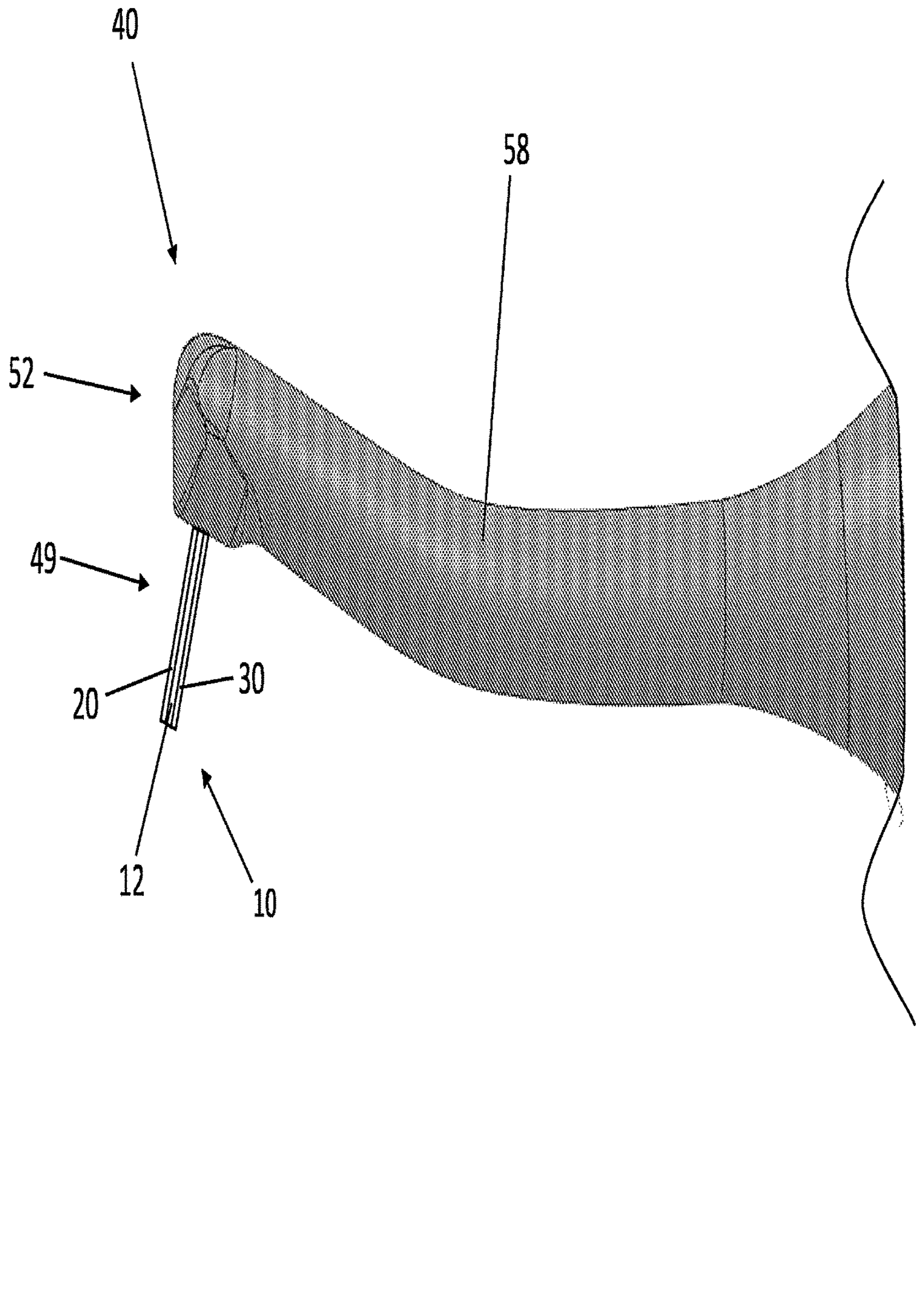
FIG. 6 shows a 3-dimensional view of a plasma head in a third embodiment comprising an electrode arrangement in a plasma exiting tip

A third embodiment of a plasma head 40 with an electrode arrangement 10 which is shown in FIG. 6 differs from the second embodiment of FIG. 5 in that the plasma exiting 49 is not rotationally attached to the head body 58. The tip 49 is attached in a fixed rotational position to the head body 58.

Figure 7:
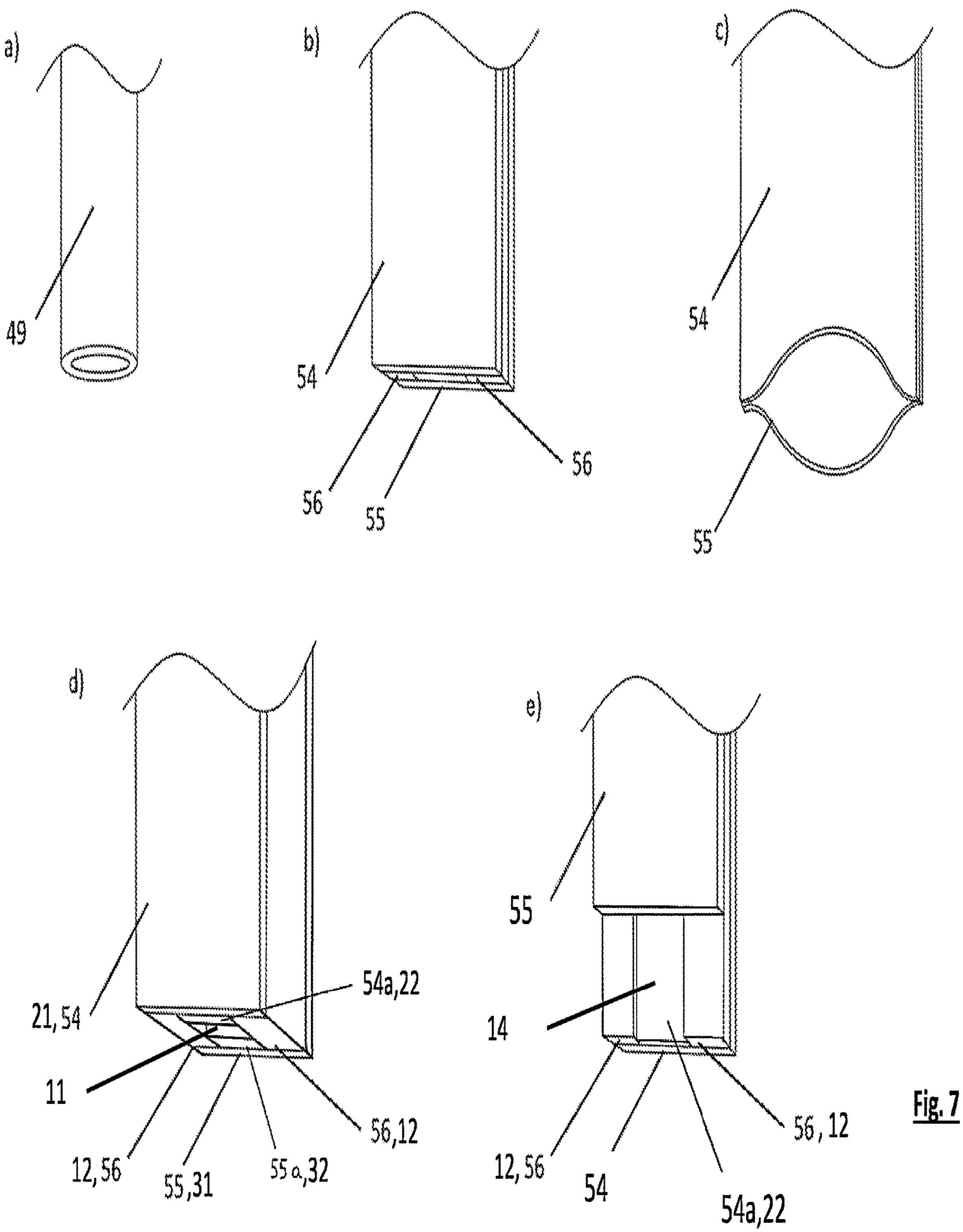
FIG. 7*a-e* show partial views of five embodiments of a plasma exiting tip

FIGS. 7 a-e show alternative embodiments of the plasma exiting tip 49. The plasma exiting tip 49 of FIGS. 7*a-c* are passive tips and the ones of FIGS. 7*d* and 7*e* are active tips having one or two electrodes. In FIG. 7*a*, the plasma exiting tip is made of a straight pipe particularly made of polyimide. In FIGS. 7*b* and 7*c*, the plasma exiting tip 49 comprises two sheets 54, 55. In the embodiment according to FIG. 7*b*, the two sheets are connected at opposite ends by spacers 56. Accordingly, the plasma exiting tip 49 has a rectangular cross section with a rectangular duct inside. In the embodiment of FIG. 7*c*, the two sheets 54, 55 are made of a film, e. g. a polyimide film. The two films are attached to each other at their longitudinal sides. The two sheets may be attached to each other by welding or gluing. Between the longitudinal sides a channel is built. The cross-section of the channel may be pre-formed and/or flexible.

The tip 49 of FIG. 7*d* comprises two sheets 54, 55. Sheet 54 is formed by the substrate 21 of the first printed circuit board 20 and is coated with a conductive track 22 on one side facing towards the plasma cell 11 and serving as first electrode 54*a*. Sheet 55 is formed by the substrate 31 of the second printed circuit board 30 and is coated with a conductive track 32 on one side facing towards the plasma cell 11 and serving as first electrode 55*a*. The two printed circuit boards 20, 30 and preferably the two substrates 21, 31 are connected to each other on their lateral sides via the spacer 12, 56. The cross section of the tip 49 is generally rectangular wherein the dimensions of width and height may vary depending on the intended use. In the shown embodiment, the cross section is square. The two substrates 21, 31 and the spacer 12, 56 are preferably flexible and more preferably made of polyimide. The active tip 49 may also be made of rigid substrates 21, 31 and a rigid spacer 12, 56.

In the embodiment of FIG. 7*e* only the sheet 54 forming the first substrate 21 is coated with a conductive track 22 at least in the area of the gas outlet 14. The second sheet 55 may be made of the same material as the first sheet 54 or of a different material. The spacer 56 and the first printed circuit board 20 have the same length, i.e. protrude equally from the head body 58 (not shown). The second sheet 55 is recessed with regard to the spacer 12, 56 and the first printed circuit board 20 such that the first conductive track 22 serving as first electrode 55*a* is exposed. The second electrode (not shown) may be provided on an object to be treated, e.g. a metal implant or a human/animal body. The electric discharge is formed between the first electrode 54*a* and the second electrode leading to a plasma generation directly at object to be treated. It may be understood that the embodiment show in FIG. 7*e* differs from the other embodiments in that it contains only one electrode in the plasma head 40. A person skilled in the art would understand that all modifications and variations described with regard to the previous embodiments may be applied to the present embodiment with only one electrode.

The invention claimed is:

1. An electrode arrangement for a plasma jet device comprising:

a first printed circuit board having a first exposed surface of a first conductive track serving as a first electrode, and a second printed circuit board having a second exposed surface of a second conductive track serving as a second electrode;

a spacer sandwiched between and in contact with the first and second printed circuit boards;

a plasma cell formed by the first and second printed circuit boards and the spacer wherein the plasma cell has a gas inlet and a plasma outlet;

wherein the spacer defines side walls of the plasma cell and a height of the spacer defines a distance between the first and second printed circuit boards and between the first and second electrodes;

wherein the first exposed surface of the first conductive track is facing the second printed circuit board and the second exposed surface of the second conductive track is facing the first printed circuit board;

wherein the first and the second printed circuit boards have an identical shape and are arranged in a mirrored position flipped by 180 degrees around a longitudinal gas flow axis between the gas inlet and the plasma outlet;

wherein each of the first and the second printed circuit boards has a finger shaped projection providing an electrical connection located at a side of the gas inlet.

2. The electrode arrangement according to claim 1 wherein the spacer is made of plastic.

3. The electrode arrangement according to claim 1, wherein the first and second electrodes are laterally spaced apart by the spacer, wherein a first groove is arranged in the first printed circuit board between the first electrode and the spacer and a second groove is arranged in the second printed circuit board between the second electrode and the spacer, further wherein the first groove has a depth being equal to or greater than a thickness of the first conductive track and the second groove has a depth being equal to or greater than a thickness of the second conductive track.

4. The electrode arrangement according to claim 1, wherein the first and second printed circuit boards are arranged in parallel to each other.

5. The electrode arrangement according to claim 1, wherein the first and second exposed surfaces each comprises a coating.

6. The electrode arrangement according to claim 1, wherein the first and second printed circuit boards and the spacer are made of a flexible material.

7. The electrode arrangement according to claim 1, wherein the first and the second electrodes are adapted to be connected with a pulsed voltage source such that pulse discharges between the first and the second electrodes are generated.

8. A plasma head having a first end and an opposite second end comprising:

the electrode arrangement according to claim 1 on the first end;

a connector for connecting the plasma head with a handle on the second end; and electrical and gas connections from the connector to the electrode arrangement.

9. The plasma head according to claim 8 having a plasma exiting tip in form of a hollow cylinder.

10. The plasma head according to claim 9 having a plasma exiting tip consisting of two sheets which are connected to each other at two lateral sides, wherein each of the two sheets comprise a polyimide film, wherein the electrode arrangement is part of the plasma exiting tip.

11. The plasma head according to claim 8, wherein the connector comprises a mechanical connector having cylindrical segments arranged coaxially to each other and two electrical connectors extending radially beyond the outer cylindrical surface of the cylindrical segments.

12. The plasma head according to claim 11, wherein each of the two electrical connectors is connected to one of the first and second printed circuit boards, wherein the first and second printed circuit boards are connected to build a support extending along an axis of the cylindrical segments.

13. The plasma head according to claim 12, wherein a gas connector at a front face of the cylindrical segments is fluidly connected with a hollow of the support.

* * * * *